United States Patent [19]

Tuchler et al.

[11] Patent Number: 4,994,960

[45] Date of Patent: Feb. 19, 1991

[54] INTERRUPT SYSTEM FOR TRANSMITTING INTERRUPT REQUEST SIGNAL AND INTERRUPT VECTOR BASED UPON OUTPUT OF SYNCHRONIZED COUNTERS REPRESENTING SELECTED PRIORITY VALUE

[75] Inventors: Daniel S. Tuchler, Newton; Bruce S. Allen, Concord, both of Mass.

[73] Assignee: Jupiter Technology, Inc., Waltham, Mass.

[21] Appl. No.: 378,422

[22] Filed: Jul. 10, 1989

Related U.S. Application Data

[63] Continuation of Ser. No. 819,532, Jan. 16, 1986, abandoned.

[51] Int. Cl.⁵ .............................................. G06F 13/372
[52] U.S. Cl. .................................. 364/200; 364/241.2; 364/242.8; 364/271.2; 340/825.52; 340/825.65
[58] Field of Search ... 364/200 MS File, 900 MS File; 340/825.07, 825.08, 825.52, 825.65

[56] References Cited

U.S. PATENT DOCUMENTS

| | | | |
|---|---|---|---|
| 4,017,841 | 4/1977 | Jensen | 364/900 |
| 4,177,515 | 12/1979 | Jenkins et al. | 364/200 |
| 4,232,294 | 11/1980 | Burke et al. | 364/200 |
| 4,285,037 | 8/1981 | Von Stetten | 364/200 |
| 4,360,870 | 11/1982 | McVey | 364/200 |
| 4,388,686 | 6/1983 | Haid | 364/200 |
| 4,442,502 | 4/1984 | Friend et al. | 364/900 |
| 4,556,939 | 12/1985 | Read | 364/200 |
| 4,559,536 | 12/1985 | Olesen et al. | 340/825.07 |
| 4,608,685 | 8/1986 | Jain et al. | 370/85 |
| 4,635,192 | 1/1987 | Cerron et al. | 364/200 |
| 4,636,790 | 1/1987 | Diamond | 340/825.52 |
| 4,646,260 | 2/1987 | Chasse et al. | 364/900 |
| 4,679,192 | 7/1987 | Vanbrabant | 340/825.52 |
| 4,682,168 | 7/1987 | Chang et al. | 340/825.52 |
| 4,773,005 | 9/1988 | Sullivan | 364/200 |
| 4,875,158 | 10/1989 | Ashkin et al. | 364/200 |

Primary Examiner—Thomas C. Lee
Attorney, Agent, or Firm—Weingarten, Schurgin, Gagnebin & Hayes

[57] ABSTRACT

A data transfer system including a byte bus which provides an eight-bit data transfer between a processor and a plurality of port circuit boards. The system provides dual address and interrupt functionalies in the processor-initiator data transfers which may be initiated in either direction. The processor data transfers use a two-level address management scheme, which once initialized provides rapid access to a select number of address locations from a large number of available addresses allocated to a variety of port circuit boards and addressable functions thereon. Furthermore, the select addresses are assignable according to an interrupt priority value which allows for the rapid identification of the address requesting an interrupt service, and also for the subsequent provision of an interrupt service vector to the processor to provide the appropriate processing of the requested interrupt. The resulting apparatus and method provides substantial compaction of the communication data distribution system and software driving utilities.

1 Claim, 2 Drawing Sheets

SYSTEM BLOCK DIAGRAM

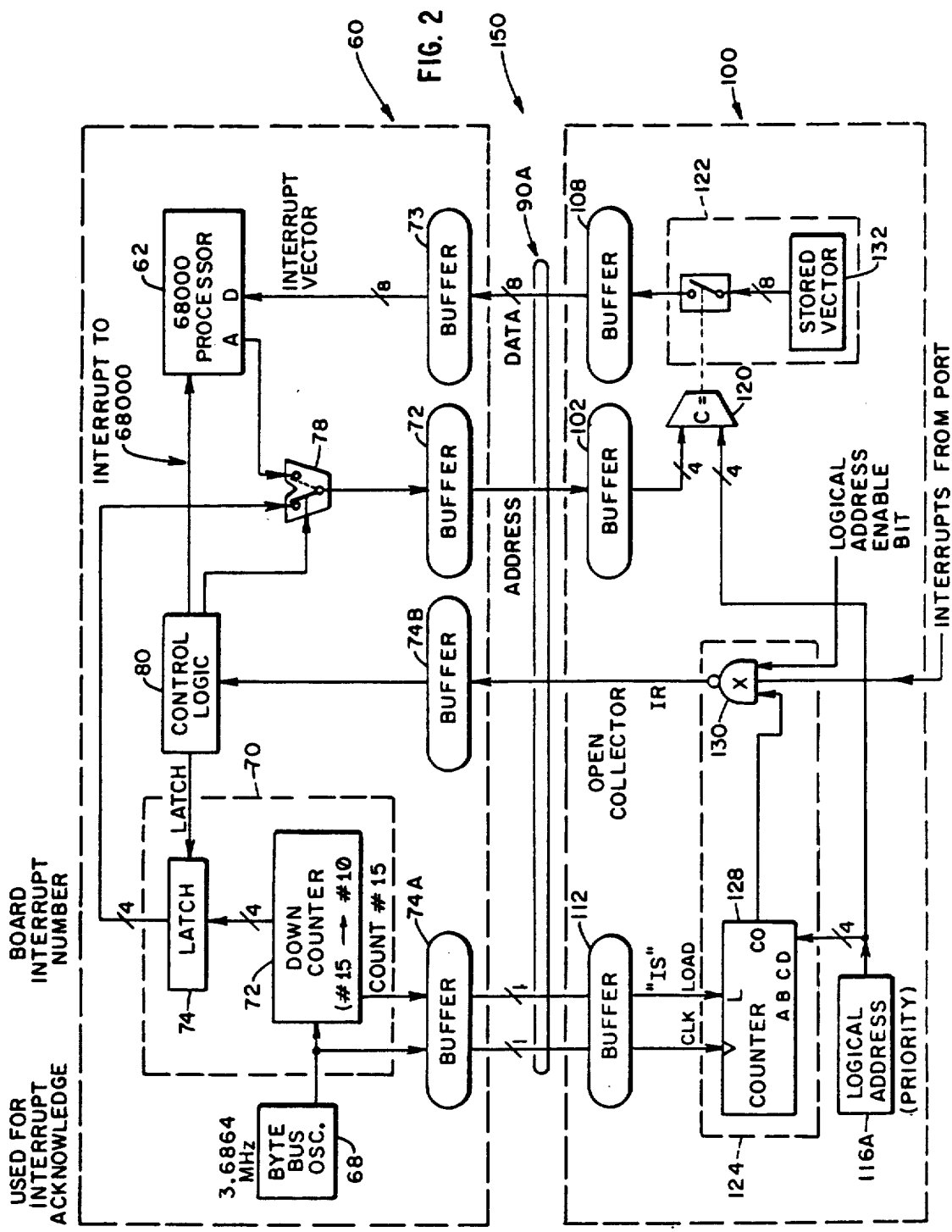

INTERRUPT SYSTEM FOR TRANSMITTING INTERRUPT REQUEST SIGNAL AND INTERRUPT VECTOR BASED UPON OUTPUT OF SYNCHRONIZED COUNTERS REPRESENTING SELECTED PRIORITY VALUE

This application is a continuation of application Ser. No. 06/819,532, filed Jan. 16, 1986 now abandoned.

FIELD OF THE INVENTION

The present invention relates to data transfer systems, in particular to data bus structures incorporated into communications data systems.

BACKGROUND OF THE INVENTION

Telecommunication systems are required to provide data transfer between a large number of data paths through a central or distributed processing system. Communication system requirements of flexibility, power, speed of interface and a number of electrical signals necessary to implement such an interface are limited by practical physical and processing limitations such as to the number of signals for each data path to be used for a data transfer, as well as the cost of implementation of the large number of signal paths which need to provided. The number of address signals and corresponding hardware can be reduced through the use of signal multiplexing, however, at the cost of increasing the time needed to access any particular data path and to transfer data and the increasing cost of such multiplexing circuitry and thus makes this approach of limited value. Moreover, the data transfer itself is slowed in the interface.

A similar problem exists when the connected data source requests access to the central processing equipment through an interrupt request, as such request places a burden on the system to quickly identify which data path and corresponding hardware element is making such request and to quickly provide the service of such an interrupt to the particular identified device and data path. Previously used interrupt techniques are ultimately limited by the increased number of data paths. The interrupt request circuitry commonly requires a separate signal for each board or path requesting interrupt service, which would then translate into a separate path for each board, which typically contains a limited number of interrupt request paths. Alternately, all circuit boards may share a single interrupt line with the central processor polling the device to determine the originator of the interrupt request. However, polling procedures slow the system by a significant factor which may impose a limitation on the size of the system. In another approach, the interrupt request may be daisy-chained from data paths organized on separate circuit boards; however, this requires specialized and expensive cables which must be installed in a particular manner, and provides slow interrupt service.

Therefore, the use of conventional techniques for addressing devices external to the processor and servicing interrupt requests becomes a significant limitation of the size and effectiveness of timing of data communication systems.

SUMMARY OF THE INVENTION

The apparatus and method according to the present invention provides for the transfer of data between a processor and a plurality of similar port boards, each having themselves a plurality of data ports thereon each providing a particular selectable address data path. The processor initially addresses a large number of possible locations (such as 512), of which a lesser number of port boards (16 in the present embodiment) will respond. Each responding port board is identified according to an address derived from one of the physical locations available to the particular port board. As each port board returns a response address, the processor then assigns a subaddress to each port board according to a processor address mapping routine. The subaddresses are written into a loadable register in each of the responding port boards and thereafter known as the port board logic logical address. After all responding port boards receive a selected logical address, the processor thereafter addresses the port boards by the use of the subaddresses, having dispensed with the use of the larger addresses derived from the physical car locations, and the necessity of polling all of the 512 possible board locations.

The assigned subaddress is further used in the implementation and servicing of the interrupt request for any port board in the following manner. The processor and the corresponding port board (as well as the non-requesting port boards) each include a synchronized ditigal counter having a total number of states equal to the number of states available in the subaddress. The counters proceed in synchronism, whereupon the port board requesting an interrupt asserts a request on the interrupt request line when the counters equal the subaddress. In this manner, the assignment of each port board with a subaddress can be further used to provide a determination of the priority of interrupt requests, for further system simplification and increase of efficiency. Upon receipt of the interrupt request signal, the signal from the counter in the processor is stored in a register. When the interrupt is acknowledged, the register content is returned to the port board via the address lines. Upon receipt of the returned address, the respective port board subsequently returns a prestored eight-bit data word to the processor board, which serves as the interrupt vector, for the processor such the Motorola 68000 series microprocessors.

Therefore, according to the method and apparatus of the present invention, the unwieldy addressing of the address space typically allocated to a filed of data paths in a communications processor is narrowed to a single four-bit subaddress, which further provides identification of the port board requesting interrupt service and the corresponding interrupt service vector.

BRIEF DESCRIPTION OF THE DRAWING

These and other features according to the present invention will be better understood by reading the following detailed description taken together with the drawing, wherein:

FIG. 2 is a block diagram of the interrupt logic of FIG. 1,

DETAILED DESCRIPTION OF THE INVENTION

Figure 1:
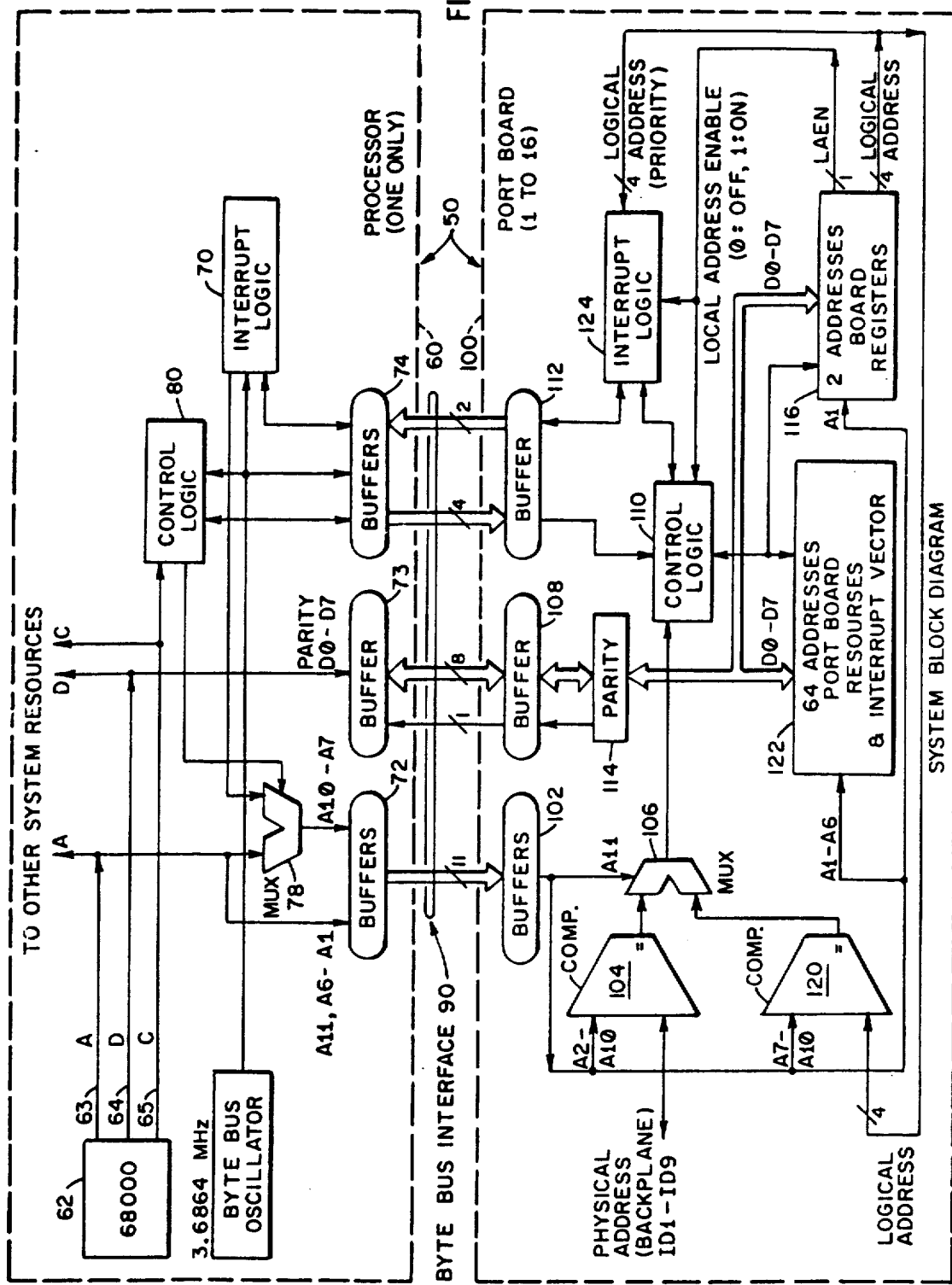
FIG. 1 is a block diagram of the system according to the present invention.

The system in which the present invention is embodied provides a selected transfer of data between a processor and several I/O devices called port boards according to activation of read (RD) and write (WR) signals as defined by the particular processor hardware used. The port boards are selected by an addressing scheme described below in detail. Subsequently, data is transfered and a signal (DA) is sent to indicate the conclusion of the data transfer process. Thereafter the processor resumes other operations. Related applications entitled Universal Programmable Data Communication Connection System, Ser. No. 819,884 and Modular Backplane, Ser. No. 819,534, now abandoned are incorporated by reference.

The general block diagram of the system according to the present invention is shown in FIG. 1. The processor circuit board 60 includes a processor 62 or other arithematic logic data processing unit, such as a Motorola MC 68000 or its equivalent in components or discrete logic. The processor 62 has address, data and control leads 63, 64 and 65 respectively which are connected through interface logic 70 and buffers 72, 73 and 74 to the port boards 100 over a byte bus 90. Byte bus 90 control signals are provided by the system card 60 via the buffer 74, and the byte-wide data path is provided over the byte bus through the buffer 73. The control and data transfers are made in the manner known in the art and are explained in the reference material for the MC 68000, incorporated by reference, as well as other references. However, the address signals provided by the processor circuit 60 includes a multiplex address signal provided through buffer 72, in which address bits A10-A7 are multiplexed via multiplex circuit 78, and controlled by control logic 80, wherein the address signal presented to the byte bus 90 initially includes the address signal provided by the 68000 micrcoprocessor 62 (sequencing all 512 possible port board address locations). The initial data transfer comprises an address which includes bits A2-A10 and includes the bits A1 and A11 as logical select and register address bits as read in the port boards 100. Upon subsequent interrupt acknowledge, circuit 78 provides a shortened data signal comprising bits A10-A7 to the byte bus, as discussed below with regard to FIG. 2.

As previously mentioned, the system according to the present invention uses a two-level address management scheme which provides a relatively large number (64) of signal path addresses on each port board, while allowing selection of up to 16 port boards from a pool of 512 possible port board address locations. The system according to the present invention initialy scans all of the 512 possible port board address locations (physical addresses), which are identified by each card according to where it is physically inserted (by a pre-encoded plug connector address arrangement), from which the processor 62 determines and transmits to each respective port board card (of a total 16) a subsequent logical address, for subsequent address cycling. Accordingly, this scheme allows for a total of 2048(16 ×64×2 registers) addresses as compared with the direct addressing of 32,768 signal path byte (2 per 16 bit word) addresses (of which only the lower byte is used).

The initial physical address data is received on the port board 100 of FIG. 1 through buffers 102, whereupon the address bits A2-A10 are received by a comparator 104 which compares the received address bits to a hardwired backplane (physical) identification ID 1-ID9. Received address bit A11 serves as a multiplex control signal, to control the multiples circuit 106. During the initial addressing sequence, the address bit A11 permits the equal (=) output signal of comparator 104 to be received by the control logic 110. When the initial address is received by the port board 100 and compares favorably with the (physical) address signal ID1-ID9, the comparator 104 provides an equivalence (=) signal which is acknowledged to the processor circuit 60 through the control logic 110 and control buffer 112. Subsequently, a four-bit address is sent from the processor 62, as part of a byte wide (eight bit) signal via buffer 73, and buffer 108; parity error detection circuit 114 to the address board register 116 of port board(s) 100. The received byte, including a four-bit address included therein is loaded into the registers 116, to subsequently serve as a logical address. Moreover, a fifth bit component of the received eight-bit data word comprises a logical address enable bit (LAEN) which is used to activate the port board logic to subsequently respond to the logical address. After the LAEN is set and a logical address is received, whenever A11=1, from processor 62, the address signal is provided by the processor circuit 60 and port board buffers 102 to comparator 120. The comparator 120, receiving the newly stored logical address from the registers 116 provides an (=) output signal when part of the received address signal (A10-A7) and the logical address are equal. A6-A1 are available to select registers. The comparator output signal is passed to the control logic through the multiplex circuit 106 for a change of the logic address bit A11 from the initial state.

Where the port boards initiate a data connection to transfer data, an interrupt must be made to the processor 62 and processor circuit 60. Sixteen port boards are scanned by Interrupt Logic by processor board without involving the processor (68000) itself. Scanning happens at a very fast rate (and is typically an order of magnitude faster than interrupt service time). During scanning period time, each port board has a turn wherein it may or may not request an interrupt. If interrupt is requested, that request is passed to 68000. According to the present invention, interrupt logic 124 provides an interrupt signal to the processor circuit 60 through the buffer according to the logic address previously provided and stored in board register 116. Since the present system provides for a reduced number of addresses (16 vs 512) which must be interrogated to determine the port board requesting the interrupt, the system will provide a more rapid response to an interrupt request. The processor 62 and processor circuit board 60 respond to the interrupt request. The processor 62 initiates an interrupt acknowledge cycle and interrupt logic sends out the logical address corresponding to the board that requested the interrupt. This logical address is used to interrogate the port board 100 to derive an interrupt vector from the circuit 122. Thereafter, the processor 62 commences and completes the appropriate interrupt service routine, returning thereafter to normal system operation.

The interrupt logic and signaling process is shown in greater detail in the block diagram 150 of FIG. 2. The processor circuit 60 clock 68 provides a periodic signal to the interrupt logic circuit 70 which includes therein a four-bit down-counter 71 which provides a carryout signal (sync) to the buffer 74A which also receives the clock signal. The clock and sync signal is received by the interrupt logic 124 of the port board circuit 100, which includes a up counter 128. The counter 128 receives the downcounter 72 clock signal and the carryout signal (sync) so that both counters are synchronized. When the counter 128 receives a load signal, it also receives and loads the logical address signal from register 116A, being previously stored according to the aboe-described logical address sequence. After receiving the logical address, the counter 128 proceeds to count until a carryout signal is produced, which is received by gate 130, which in concert with an interrupt signal from the port card and enabled logical address bit (LAEN) produces an interrupt request on byte bus 90 to the control logic 80 of the processor circuit 60 through the buffer 74B. The control logic 80 then directs the latch 75 to store the four-bit downcounter 71 output signal, and to signal the processor 62 to begin the interrupt service process. At interrupt acknowledge time, the output from the latch 74 is provided to the port board 100 through buffer 72 and multiplex circuit 78. The received latch 75 output signal, received through buffer 102 is compared by comparator 120 with the previously received logical address from the register 116A. In this manner, the process circuit 60 provides an address to the family of port boards which enables a particular one to respond and identify itself as the port board making the interrupt request as indicated by the equivalence output of the comparator 120. Upon equivalence of the logical address with the received four-bits of data (A10-A7), the port board provides a previously stored vector to the processor 62 from a vector storage location 132 within the 64 port board register and resource circuit 122 through buffer 108 and 73. The processor, having received a vector on the data lin, thereafter initiates, processes and completes the vector interrupt service routine according to programs directing the operation of the processor 62. Subsequently, the system returns to normal signal processing.

Further modifications and substitutions for one skilled in the art are within the scope of the present invention which is not limited except by the claims which follow.

We claim:

1. An apparatus for allocating priority of, and servicing interrupt requests, for use with a system having address transfer means and data transfer means, comprising:

a primary element including:
  interrupt logic including means for providing a clock signal, and a primary element counter receiving said clock signal, said primary element counter providing an output synchronization signal and an output count
  means for providing a selectable interrupt priority address,
  means for storing the output count of said primary element counter,
  means for receiving an interrupt request signal, and
  means for providing interrupt service, said interrupt service being provided in response to a received interrupt request signal and a received interrupt vector;

said primary element providing, independently of said address and data transfer means, said primary element counter output count, said clock signal, and said counter output synchronization signal; and at least one secondary element having a physical system address, including:
  a logical address register receiving said selectable interrupt priority address from said primary element over said data transfer means upon the equivalence of said secondary element physical system address with an address from said system address transfer means,
  a counter for receiving said clock signal and said synchronization signal from said primary element, for synchronization of said secondary element counter to said primary element counter, and for receiving said selectable interrupt priority address signal from said logical address register for providing a counter output signal according to the number of received clock signals and the received selectable interrupt priority address signal,
  means for providing an interrupt initiate signal,
  interrupt request means, for providing said interrupt request signal to said primary element upon the occurrence of said interrupt initiate signal and the concurrence of said secondary element counter output signal with said interrupt initiate signal, wherein said primary element means for storing said primary element counter output count is responsive to said interrupt request signal for storing the output count of said primary element counter upon receipt of said interrupt request signal, and
  means for storing a selected interrupt vector, and for providing said stored interrupt vector to said primary element upon the equivalence of said primary element counter output count with said selected interrupt priority address, for providing said stored interrupt vector to said primary element for servicing said interrupt request from said secondary element.

* * * * *

UNITED STATES PATENT AND TRADEMARK OFFICE
CERTIFICATE OF CORRECTION

PATENT NO. : 4,994,960

DATED : February 19, 1991

INVENTOR(S) : Daniel S. Tuchler, Bruce S. Allen

It is certified that error appears in the above-identified patent and that said Letters Patent is hereby corrected as shown below:

Column 1, lines 26-27, "signal paths which need to provided" should read --signal paths which need to be provided--;

Column 1, line 60, "a significant limitation of" should read --a significant limitation on--;

Column 2, line 46, "allocated to a filed" should read --allocated to a field--;

Column 3, line 64, "to control the multiples circuit 106." should read --to control the multiplex circuit 106.--;

Column 5, line 28, "on the data lin," should read --on the data line,--;

Column 5, line 48, "signal and an output count" should read --signal and an output count,--;

Column 6, line 46, "selected interrupt priority" should read --selectable interrupt priority--.

Signed and Sealed this

Twenty-third Day of February, 1993

*Attest:*

STEPHEN G. KUNIN

*Attesting Officer*    Acting Commissioner of Patents and Trademarks